US010035492B2

(12) United States Patent
Lee

(10) Patent No.: US 10,035,492 B2
(45) Date of Patent: Jul. 31, 2018

(54) MODULE FOR DETECTING FASTENING OF SEAT BELTS AND METHOD FOR DETECTING BY USING SAME

(71) Applicant: WOOSHIN SAFETY SYSTEMS CO., LTD., Hwaseong-si (KR)

(72) Inventor: Kyung Sang Lee, Anyang-si (KR)

(73) Assignee: WOOSHIN SAFETY SYSTEMS CO., LTD., Hwaseong-si (KR)

(*) Notice: Subject to any disclaimer, the term of this patent is extended or adjusted under 35 U.S.C. 154(b) by 0 days.

(21) Appl. No.: 15/307,171

(22) PCT Filed: Apr. 27, 2015

(86) PCT No.: PCT/KR2015/004176
§ 371 (c)(1),
(2) Date: Oct. 27, 2016

(87) PCT Pub. No.: WO2015/167188
PCT Pub. Date: Nov. 5, 2015

(65) Prior Publication Data
US 2017/0050613 A1 Feb. 23, 2017

(30) Foreign Application Priority Data
Apr. 28, 2014 (KR) .................. 10-2014-0050879

(51) Int. Cl.
B60R 22/48 (2006.01)
B60R 21/00 (2006.01)
(52) U.S. Cl.
CPC ...... B60R 22/48 (2013.01); B60R 2022/4816 (2013.01); B60R 2022/4866 (2013.01)

(58) Field of Classification Search
None
See application file for complete search history.

(56) References Cited

U.S. PATENT DOCUMENTS 3,875,556 A * 4/1975 Beaird .................. B60R 22/48
280/801.1
5,877,707 A * 3/1999 Kowalick ................ B60R 1/12
340/439

(Continued)

FOREIGN PATENT DOCUMENTS

JP 2009090962 4/2009
KR 2019960009356 10/1996

(Continued)

OTHER PUBLICATIONS

International Search Report—PCT/KR2015/004176 dated Jul. 14, 2015.

Primary Examiner — Fekadeselassie Girma
(74) Attorney, Agent, or Firm — Cantor Colburn LLP0

(57) ABSTRACT

Provided is a module for detecting fastening of a seat belt, which enables a driver to detect whether passengers fasten seat belts in a transportation means including a plurality of seats and having many passengers, the module including: transmitting units configured to detect whether the passengers seated on the seats fasten the seat belts and selectively generate signals; a receiving unit configured to independently receive the signals transmitted from the transmitting units; and a display unit configured to display information about the seat, of which the passenger fastens the seat belt, to a driver through the information received from the receiving unit, in which the signals generated in the plurality of transmitting units are distinctly separated and transmitted.

1 Claim, 6 Drawing Sheets

(56) References Cited

U.S. PATENT DOCUMENTS

| | | | | |
|---|---|---|---|---|
| 6,204,757 B1* | 3/2001 | Evans | ............... | B60R 22/48 340/436 |
| 6,362,734 B1* | 3/2002 | McQuade | ............... | B60R 22/48 180/267 |
| 7,003,385 B2* | 2/2006 | Bolz | ............... | B60R 22/40 280/807 |
| 2003/0014166 A1* | 1/2003 | Chinigo | ............... | B60R 22/48 701/33.7 |
| 2003/0160689 A1* | 8/2003 | Yazdgerdi | ............... | B60N 2/2812 340/457.1 |
| 2009/0088928 A1* | 4/2009 | Schroeder | ............... | G01C 21/3641 701/45 |
| 2009/0177357 A1* | 7/2009 | Long | ............... | B60R 22/48 701/45 |
| 2011/0186374 A1* | 8/2011 | McCoy | ............... | B60R 21/00 180/268 |
| 2012/0062375 A1* | 3/2012 | Takeuchi | ............... | B60W 50/085 340/441 |
| 2013/0274957 A1* | 10/2013 | Miller | ............... | G07C 5/085 701/1 |
| 2013/0332004 A1* | 12/2013 | Gompert | ............... | G07C 5/008 701/1 |
| 2014/0114530 A1* | 4/2014 | Fitch | ............... | G06F 17/00 701/36 |
| 2014/0218170 A1* | 8/2014 | Felkins | ............... | G06F 21/32 340/5.82 |
| 2014/0292503 A1* | 10/2014 | Schoenberg | ............... | B60R 21/01556 340/438 |
| 2017/0144774 A1* | 5/2017 | Pollard | ............... | B64D 11/062 |

FOREIGN PATENT DOCUMENTS

| | | |
|---|---|---|
| KR | 200430048 | 11/2006 |
| KR | 1020080039563 | 5/2008 |
| KR | 1020130057781 | 6/2013 |

* cited by examiner

MODULE FOR DETECTING FASTENING OF SEAT BELTS AND METHOD FOR DETECTING BY USING SAME

TECHNICAL FIELD

The present invention relates to a module for detecting fastening of a seat belt and a detecting method using the same, and more particularly, to a module for detecting fastening of a seat belt, which enables a driver to confirm whether passengers seated on seats in a transportation means transporting many people fasten seat belts in a remote distance, and a detecting method using the same.

BACKGROUND ART

In the modern society, many transportation means have been used, and seat belts are used for safety of a driver and passengers when an accident occurs. In general, the seat belt is one example of safety devices, which is capable of preventing a passenger from being seriously injured by elastically restricting a body of the passenger when sudden impact is applied to a passenger by a fender-bender or a collision accident while a vehicle travels.

As described above, the fastening of the seat belt has an advantage in preventing the passengers from being injured even though an accident has occurred, but the passengers and the drivers feel uncomfortable when fastening the seat belts, so that many passengers or drivers do not fasten the seal belts.

Recently, the fastening of the seat belt are mandatory under the regulation, and the mounting of a control system, which disables a transportation means to travel when passengers or a driver does not fasten a seat belt, may be introduced to the transportation means later.

Accordingly, a driver needs to directly induce a passenger to fasten a seat belt, and in a case of a large-sized bus, a driver needs to directly check whether passengers fasten the seat belts one by one.

As described above, there is a problem in that when a passenger unfastens the seat belt while the bus is travelling, the driver cannot substantially check the unfastening of the seat belt, together with the problem in that the driver needs to directly check whether passengers fastens the seat belts one by one, so that the problems needs to be urgently solved.

DISCLOSURE

Technical Problem

A technical object of the present invention is to solve the problem mentioned in the background art, and to provide a module for detecting fastening of a seat belt, which includes a separate transmitting unit generating an electric signal within a buckle for the seat belt provided to each of a plurality of seats and detects the electrical signal generated when a passenger fastens the seat belt, thereby detecting whether the passenger fastens the seat belt on the corresponding seat, and a detecting method using the same.

A technical object to be achieved in the present invention is not limited to the aforementioned technical objects, and other not-mentioned technical objects will be obviously understood by those skilled in the art from the description below.

Technical Solution

A technical object of the present invention is to solve the problem mentioned in the background art, and to provide a module for detecting fastening of a seat belt, which includes a separate transmission unit generating an electric signal within a buckle for the seat belt provided to each of a plurality of seats and detects the electrical signal generated when a passenger fastens the seat belt, thereby detecting whether the passenger fastens the seat belt on the corresponding seat, and a detecting method using the same.

A technical object to be achieved in the present invention is not limited to the aforementioned technical objects, and other not-mentioned technical objects will be obviously understood by those skilled in the art from the description below.

Advantageous Effects

According to the seat belt fastening detecting module according to the present invention, the following effects are obtained.

First, a separate receiver receives an electric signal generated according to the fastening of a seat belt of a passenger in a transportation means, so that a driver may remotely confirm whether the passenger fastens the seat belt.

Secondly, the seat belt fastening detecting module according to the present invention enables a driver to store a seat position of the passenger based on the fastening of a seat belt of a passenger when an operation of a transportation means is started, and continuously confirm whether the passenger is on board, and enables the driver to actively confirm whether the passenger is on board in accordance with the number and the seats of the passengers in every operation by operating a separate display device.

However, an effect of the present invention is not limited to the aforementioned effect, and those skilled in the art will clearly understand non-mentioned other effects through the following description of the claims.

BEST MODE

Hereinafter, an exemplary embodiment of the present invention will be described in detail with reference to the accompanying drawings. However, in describing the present invention, descriptions of already publicly known functions or configurations will be omitted so as to clarify a main point of the present invention.

Also, in describing the present invention, terms indicating directions, such as a front direction and a rear direction, or an upper side and a lower side, are described so as to make those skilled in the art be clearly understood, and indicate relative directions, so that the scope of the present invention is not limited by the terms.

First, a schematic configuration and detecting method of a seat belt fastening detecting module according to the present invention will be described below with reference to FIGS. 1 to 5.

Figure 1:
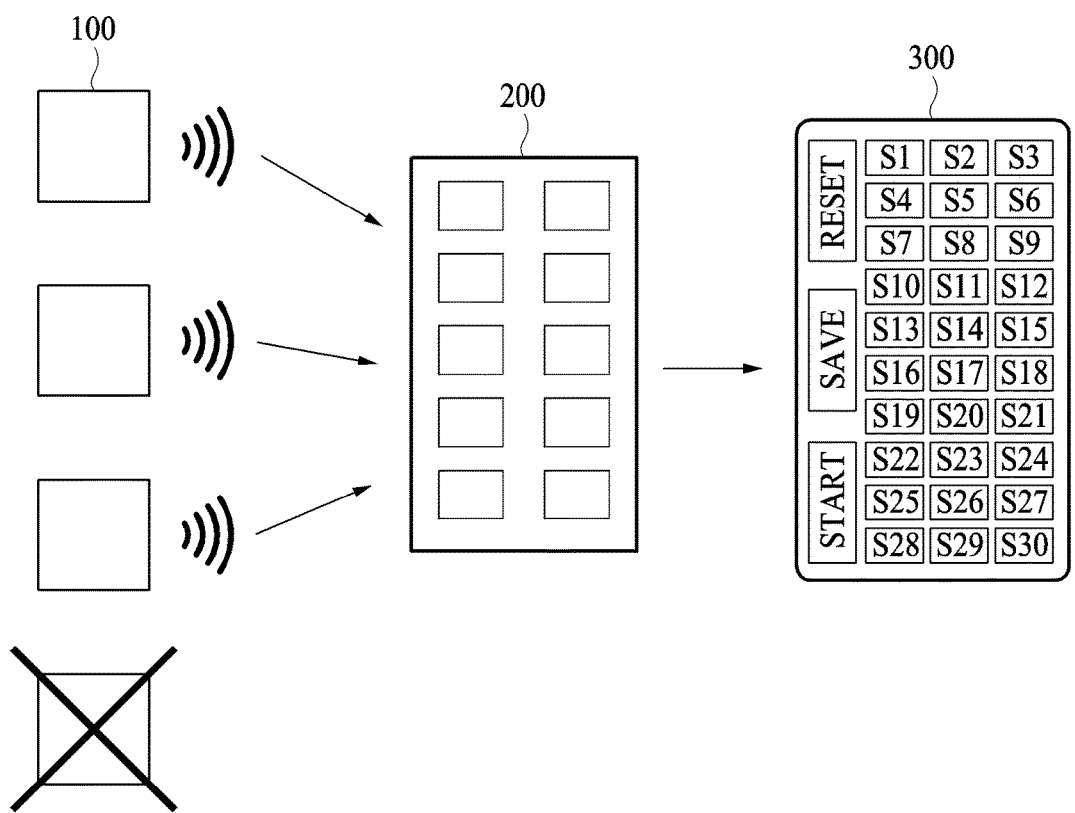
FIG. 1 is a diagram illustrating a schematic detecting method of a seat belt fastening detecting module according to the present invention.
Figure 2:
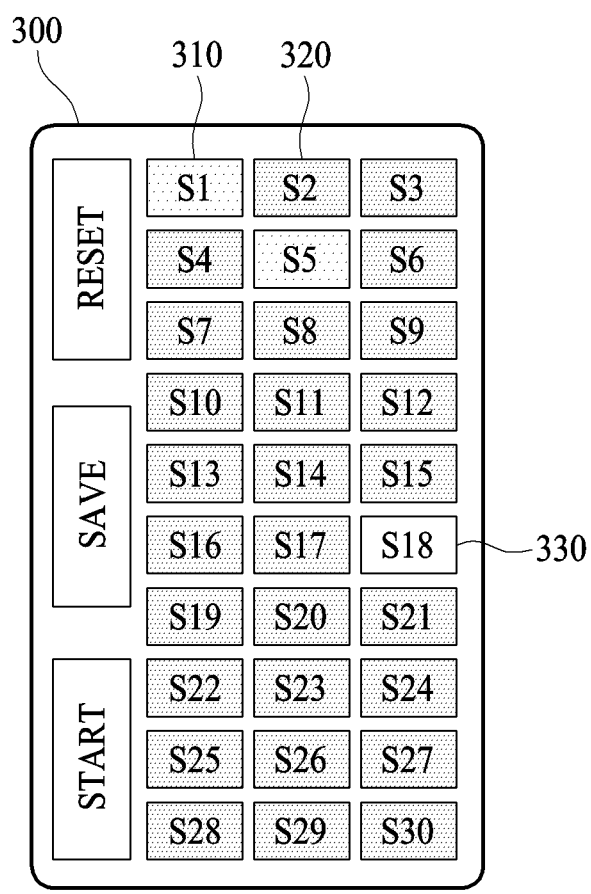
FIG. 2 is a diagram illustrating a state where a display unit detects whether passengers are seated and the passengers fasten the seat belts in the seat belt fastening detecting module of FIG. 1.

FIG. 1 is a diagram illustrating a schematic detecting method of a seat belt fastening detecting module according to the present invention, and FIG. 2 is a diagram illustrating a state where a display unit detects whether passengers are seated and the passengers fasten the seat belts in the seat belt fastening detecting module of FIG. 1.

Figure 3:
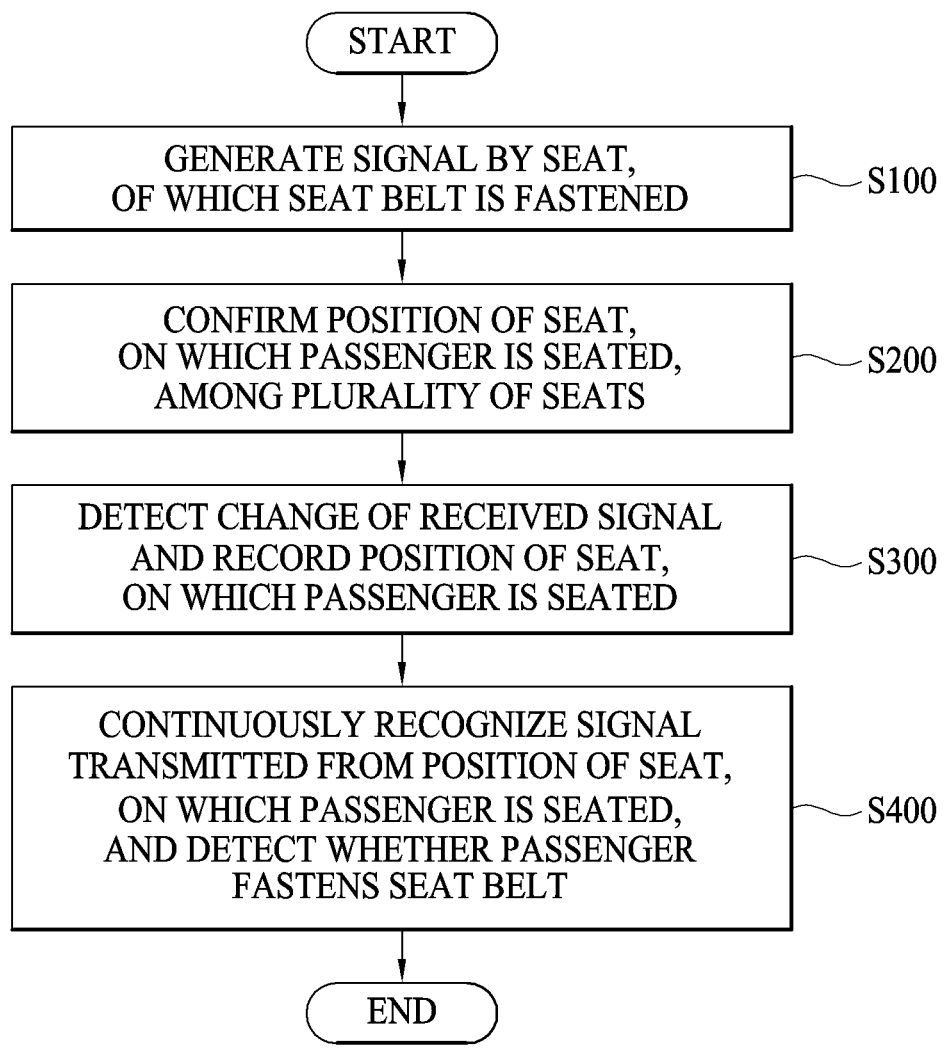
FIG. 3 is a flowchart illustrating a method of detecting, by the seat belt fastening detecting module of FIG. 1, a seat position of a passenger and whether the passenger fastens a seat belt while a transportation means is travelling.
Figure 4:
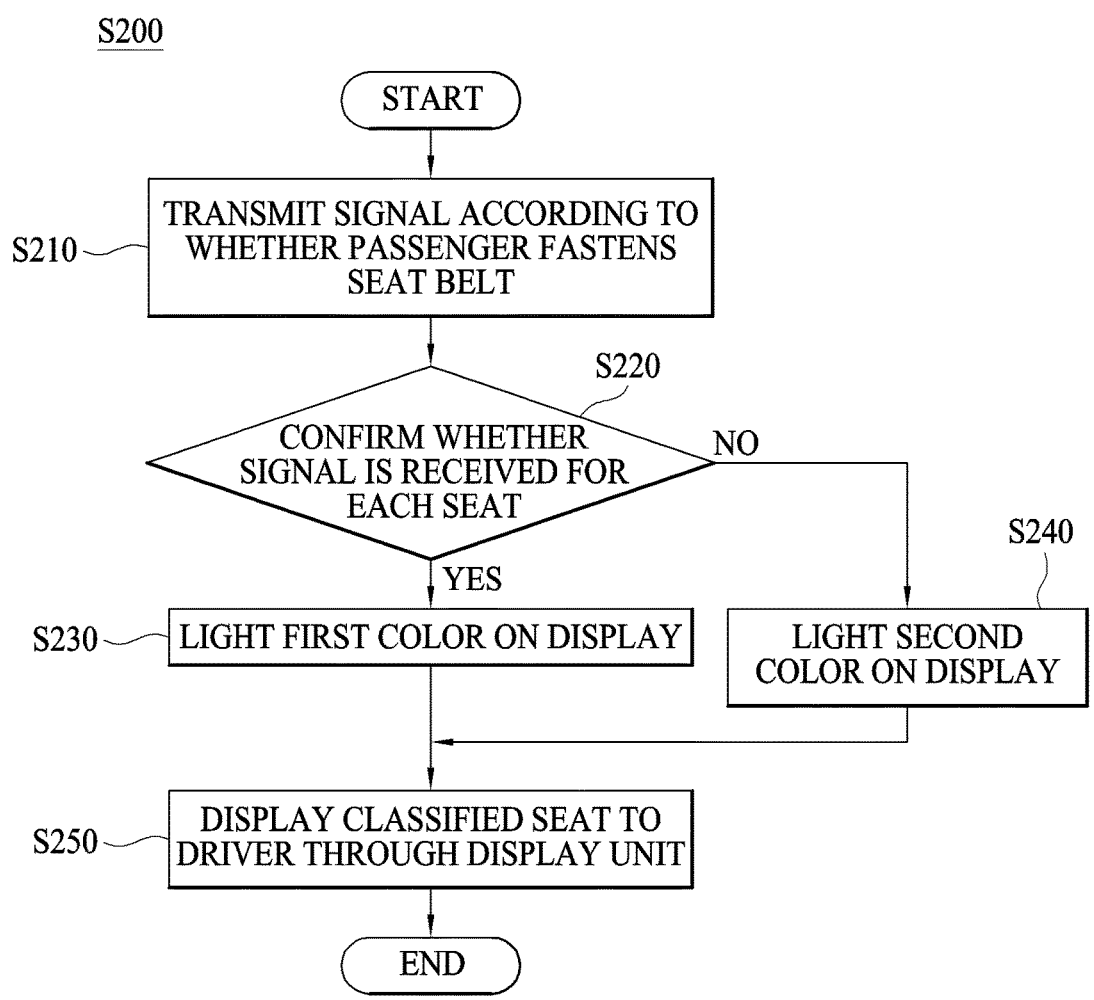
FIG. 4 is a flowchart illustrating a process of confirming, by a display unit, a seat position of a passenger in the seat belt fastening detecting module of FIG. 3.
Figure 5:
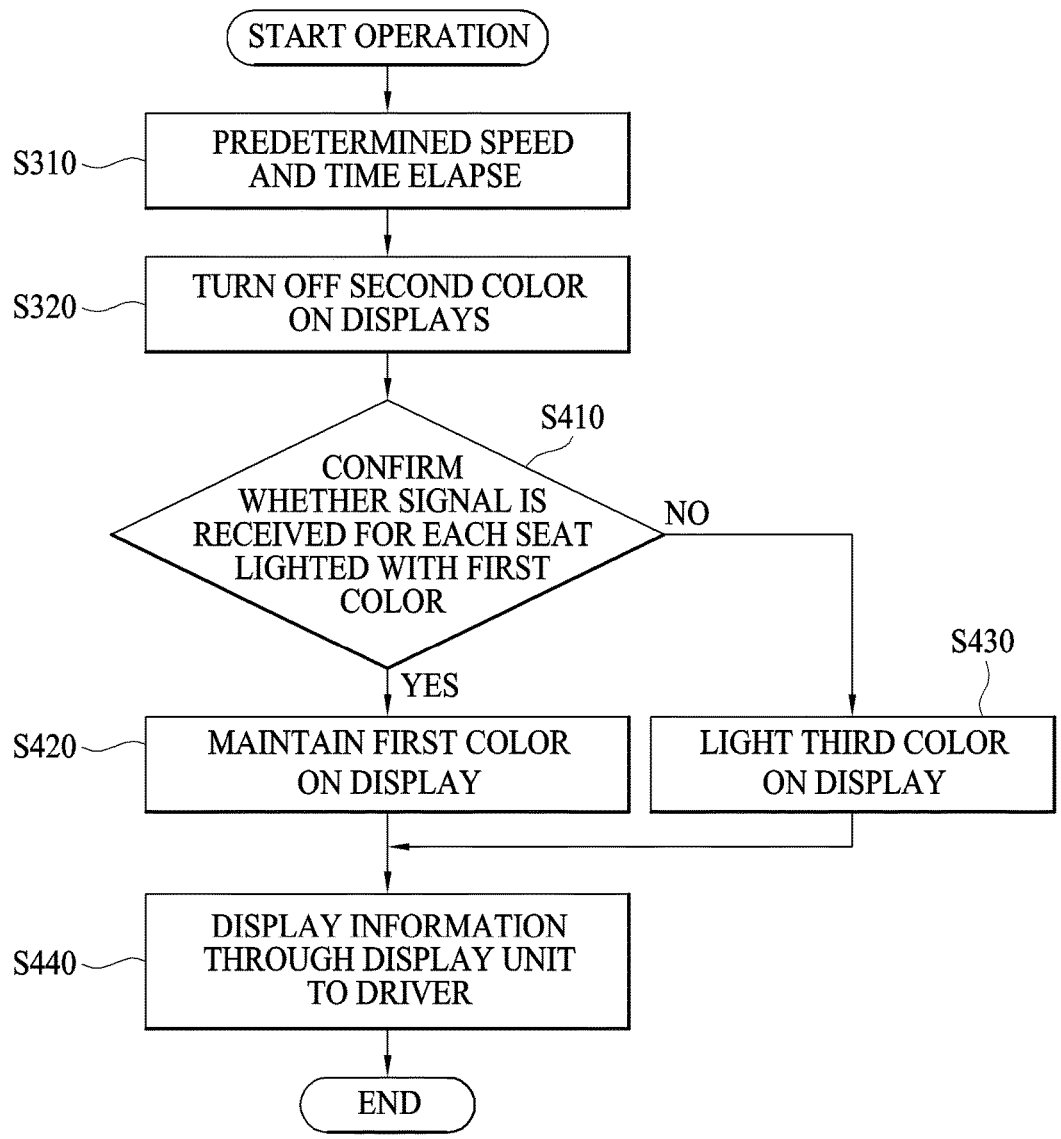
FIG. 5 is a flowchart illustrating a process of recording a seat position of a passenger and detecting whether the passenger fastens a seat belt in a corresponding seat by the display unit in the seat belt fastening detecting module of FIG. 3.

Further, FIG. 3 is a flowchart illustrating a method of detecting, by the seat belt fastening detecting module of FIG. 1, a seat position of a passenger and whether the passenger fastens a seat belt while a transportation means is travelling, FIG. 4 is a flowchart illustrating a process of confirming, by a display unit, a seat position of a passenger in the seat belt fastening detecting module of FIG. 3, and FIG. 5 is a flowchart illustrating a process of recording a seat position of a passenger and detecting whether the passenger fastens a seat belt in a corresponding seat by the display unit in the seat belt fastening detecting module of FIG. 3.

First, a seat belt 400 fastening detecting module according to the present invention will be described. The seat belt fastening detecting module is installed in a transportation means (not illustrated) which includes a plurality of seats and in which a plurality of passengers boards, and is used as a means for detecting, by a driver, whether passengers fasten the seat belts 400.

In this case, various transportation means, which a plurality of people boards, may be applied to the transportation means, and in the present exemplary embodiment, the present invention will be described based on a large-sized bus.

Particularly, the seat belt 400 fastening detecting module according to the present invention generally includes a transmitting unit 100, a receiving unit 200, and a display unit 300.

The transmitting unit 100 is provided in each of the seats provided within the transportation means and transmits a signal according to whether the passengers fasten the seat belts 400.

More particularly, the transmitting unit 100 is configured to wirelessly generate the signal, not by a general wire form, and generates the signal according to the fastening of the seat belt 400 (see FIG. 6) and transmits the generated signal to the receiving unit 200.

In the present exemplary embodiment, the transmitting unit 100 is provided within the seat belt 400, and may be formed of a general RF transmitter. Here, the seat belt 400 includes a tongue 410 connected to a first line 412 and a buckle 420 connected to the second line 422 similar to a general seat belt.

Particularly, the seat belt 400 includes the tongue 410 formed to protrude and connected to one side of the first line, and the buckle 420 connected to one side of the separate second line 422 from the first line 412 and selectively fastened with the tongue 410. In this case, the tongue 410 is fastened with the buckle 420, so that a passenger is enclosed by the first line 412 and the second line 422.

Further, the transmitting unit 100 is provided within the buckle 420 and transmits the signal to the receiving unit 200 in a state where the tongue 410 is fastened with the buckle 420.

The configuration that the transmitting unit 100 provided in the seat belt 400 selectively transmits the signal will be described below with reference to FIG. 6.

The transmitting unit 100 is wirelessly configured and provided within the seat belt 400 as described above, and selectively transmits the signal to the receiving unit 200 according to the fastening of the seat belt 400.

Accordingly, even though the transportation means does not have a complex structure, such as a separate wire, therein, the transmitting unit 100 may simply transmit whether the seat belt 400 disposed in each seat is fastened in the form of the signal.

In the meantime, the receiving unit 200 is configured to independently receive the signal transmitted from each of the plurality of seats provided within the transportation means.

Particularly, the seat belt fastening detecting module includes at least one receiving unit 200, and the receiving unit 200 receives the signal transmitted from the seat, of which the seat belt 400 is fastened, among the plurality of seats, and transmits the received information to a display unit 300 to be described below.

In the present exemplary embodiment, the receiving unit 200 may be integrally formed with or separately formed from the display unit 300 to be described below.

In the meantime, the receiving unit 200 may also further include a separate auxiliary receiving unit (not illustrated) according to a size of the transportation means and a disposition of the seats.

At least one auxiliary receiving unit is disposed while being spaced apart from the transmitting unit 100, and wirelessly receives the signal received within a predetermined area and provides the received signal to the receiving unit 200.

Particularly, in a case where it is difficult for one receiving unit 200 to receive the signal transmitted from the transmitting unit 100 according to a size of the transportation means and a disposition of the seats, when an inside area of the transportation means is divided into separate sections and the auxiliary receiving unit is provided in the corresponding section, the receiving unit 200 may receive the signal transmitted from the transmitting unit 100 provided at each seat.

Further, the plurality of auxiliary receiving units transmits the received signal to the receiving unit 200 again, and thus, the receiving unit 200 may receive all of the transmitted signals regardless of the size of the transportation means.

Here, the signals transmitted from the transmitting units 100 provided at the plurality of seat belts 400 are distinctly transmitted, and each of the signals is directly transmitted to the receiving unit 200 or the auxiliary receiving unit without interference.

Accordingly, the receiving unit 200 receives each of the signals, thereby detecting a position of the seat transmitting the signal among the plurality of seats.

In the meantime, in the present exemplary embodiment, the receiving unit 200 may be formed of a general RF receiver, and receives an RF signal transmitted from each of the plurality of transmitting units 100. That is, the transmitting unit 100 and the receiving unit 200 according to the exemplary embodiment of the present invention may be configured to transmit and receive the signal through the RF communication.

A particular principle of RFID will be described. A receiver releases data modified with a specific frequency to form an electromagnetic field, and a tag (transmitter) is operated as power formed by electromagnetic induction coupling within the electromagnetic field formed area.

Accordingly, the tag is operated within the electromagnetic field formed area and generates the signal, and the receiver receives the generated signal.

The RF technology, which is a recognition technology by a contactless wireless environment, may be operated without being influenced by other factors, unlike the existing scheme.

Particularly, the RFID technology has an advantage in momentarily reading or correcting and updating several elements of information at the same time, so that the RFID technology has been currently applied to various fields, such as logistics security.

The RF communication has been already widely used in an access control system, a toll gate electronic payment, and the like, and the RF communication is applied to the present exemplary embodiment, so that the signal may be transceived according to whether the seat belt 400 is fastened in each of the seats provided in the transportation means.

In the meantime, the display unit 300 receives the plurality of elements of the signal information received by the receiving unit 200 and displays information on a seat, on which the passenger fastens the seat belt 400 to a driver.

Particularly, the display unit 300 includes a general control unit (not illustrated) and the display unit displaying information received from the receiving unit 200.

Here, the display unit 300 draws a position of a seat, on which a passenger is seated, among the plurality of seats through the signal transmitted from the transmitting unit 100 according to the fastening of the seat belt 400 and displays the drawn position of the seat to the driver through the display unit (not illustrated).

Hereinafter, the present invention will be described by classifying the seat, on which a passenger is seated, among the plurality of seats within the transportation means, as a first seat (not illustrated), and classifying the remaining seats as second seats (not illustrated).

That is, the display unit 300 recognizes the position of the seat, of which the transmitting unit 100 transmits the signal, among the plurality of seats and classifies the seat into the first seat, and classifies the remaining seats as the second seats, and displays the first seat and the second seats to the driver.

Further, the display unit displays the seats in a form corresponding to a disposition form of the plurality of seats provided in the transportation means, and displays the seats with different colors according to whether the receiving unit 200 receives the signal.

Particularly, in the present exemplary embodiment, as illustrated in FIG. 2, the first seat is displayed with a first color 310, and the second seat is displayed with a second color 320. Accordingly, the driver may easily recognize whether the passenger fastens the seat belt 400 and a position of the seat, on which the passenger is seated and fastens the seat belt 400 through the display unit.

In the meantime, the display unit 300 according to the present invention detects a change in the signal received in the receiving unit 200 at a predetermined speed or for a predetermined time while the transportation means travels, and records position information about the first seat, on which the passenger is seated, among the seats.

That is, when the transportation means satisfies a specific condition in a state where an initial passenger is seated on a seat and fastens the seat belt 400, the display unit 300 records information about the first seat, and the recorded information may be used for recognizing the seat position of the passenger by the driver while the transportation means is operated.

In addition, the display unit 300 may recognize whether the passenger seated on the first seat continuously maintains the fastening of the seat belt 400 during the operation of the transportation means by using the recorded information about the first seat.

Particularly, when the signal, which is recorded during the operation of the transportation means and is transmitted by the transmitting unit 100 from the first seat, is stopped, it is recognized that the passenger on the corresponding seat unfastens the seat belt 400, and thus, the display unit 300 displays the unfastening of the seat belt 400 of the first seat to the driver through the display unit.

In the present exemplary embodiment, the display unit 300 displays the recorded first seat by lighting the first seat with the first color 310, and when the seat belt 400 of the seat is released among the first seats during the operation of the transportation means so that there is a seat of which the transmission of the signal is stopped, the display unit 300 lights the corresponding seat with a third color 330 and notifies the corresponding seat to the driver through the display unit.

As described above, the display unit 300 may recognize whether the passenger continuously fastens the seat belt 400 during the operation of the transportation means after the boarding seat of the passenger is recorded, as well as simply whether the passenger fastens the seat belt 400 of the seat among the plurality of seats of the transportation means when the operation of the transportation starts.

Accordingly, the seat belt 400 fastening detecting module according to the present invention receives the electric signal generated by the fastening of the seat belt 400 of the passenger in the transportation means through the separate receiver, thereby having an advantage in that the driver may remotely confirm whether the passenger fastens the seat belt 400.

Further, the display unit includes a separate reset button as illustrated in FIG. 2, so that the display unit may initialize the already recorded information about the first seat and the second seat when the operation of the transportation means is terminated or is newly started.

Next, a process of detecting the first seat, on which a passenger is seated, among the plurality of seats, and whether the passenger fastens the seat belt 400 by the seat belt 400 fastening detecting module according to the present invention will be described below.

As illustrated in FIG. 3, when a passenger is seated on a seat and fastens the seat belt 400 in the transportation means including the plurality of seats, each seat independently transmits the signal in a first operation S100.

Here, the separate transmitting units 100 are provided to the seat belts 400 provided in the plurality of seats, respectively, and when the seat belts 400 are fastened, the corresponding transmitting units 100 generate different signals, respectively.

Then, the signals generated in the first operations S100 are independently transmitted to the separate receiving unit 200 provided within the transportation means, and thus, whether the passenger is seated and the seat belt 400 is fastened is confirmed by the signal received by the receiving unit 200 and displayed in a second operation S200.

In this case, the second operation S200 includes a process S210 of transmitting the signal from each seat according to the fastening of the seat belt 400 and then a process S220 of determining whether the signal is received for each seat.

Then, the seat, in which the transmitting unit 100 transmitting the signal is positioned, among the plurality of seats is lighted with a first color 310 (S230), and the remaining seats are lighted with a second color 320 on the display unit (S240).

As described above, the plurality of seats classified with the lighting with the first color 310 and the second color 320 is displayed to the driver through the display unit (S250), and thus, the driver recognizes the seat, on which the passenger is seated, and whether the passenger fastens the seat belt 400.

In the meantime, after the second operation S200, whether the signal received at a predetermined speed or for a predetermined time is changed during the operation of the transportation means is detected, and a position of the seat, on which the passenger is finally seated and of which the seat belt 400 is fastened, among the plurality of seats is recorded in a third operation S300.

That is, when there is no change in the signal received from the receiving unit 200 after the start of the operation in a state where the initial passenger is seated and fastens the seat belt 400, the display unit 300 records the no-change of the signal, and records the information about the first seat, on which the passenger is seated, by displaying that the signal is not changed to the driver.

Further, the display unit 300 continuously recognizes the signal transmitted from the position of the first seat, on which the passenger is seated, through the information about the first seat recorded in the third operation S300, and detects whether the seat belt 400 of the first seat is fastened in operation S400.

More particularly, during the operation of the transportation means for the predetermined time or at the predetermined speed (S310) in the state where the passenger fastens the seat belt 400 in the third operation S300, when there is no change in the signal transmitted from the transmitting unit 100, the display unit 300 turns off the lighting of the second color 320 as illustrated in FIG. 5 and displays the turn off of the second color 320 to the driver through the display unit (S320).

In the present exemplary embodiment, when the transportation means travels at 30 km/h or more for five minutes or longer, information about the seat transmitting the signal to the transmitting unit 100 is stored and the seat is classified into the first seat, and the remaining seats are classified into the second seats, so that the display unit turns off the second color 320.

Unlike this, the reference of recording, by the display unit 300, the information about the first seat may be variously adjusted and applied.

As described above, the display unit 300 classifies and records the first seat and the second seat, and displays the classified first seat and second seat to the driver in the third operation S300, and then continuously checks whether the signal is received for each first seat lighted with the first color 310 (S410).

In this case, the seat, which continuously transmits the signal by the transmitting unit 100 among the first seats, is maintained with the first color 310 on the display unit (S420), and the seat, which does not continuously transmit the signal by the transmitting unit 100, is displayed with the third color 330 on the display unit (S430).

Then, the display unit 300 displays the information to the driver, so that the driver may confirm whether the passenger continuously fastens the seat belt 400 in the first seat, on which the passenger is seated (S440).

As described above, the seat belt 400 fastening detecting module according to the present invention may enable the driver to easily recognize the position of the seat, on which the passenger is seated, without a separate wire, and continuously confirm whether the passenger fastens the seat belt 400.

That is, the seat belt 400 fastening detecting module according to the present invention enables the driver to store the seat position of the passenger based on the fastening of the seat belt 400 of the passenger when the operation of the transportation means is started, and continuously confirm whether the passenger is on board, and enables the driver to actively confirm whether the passenger is on board in accordance with the number and the seats of the passengers in every operation by operating a separate display device.

Next, the configuration of the seat belt 400 provided with the transmitting unit 100 in the seat belt 400 fastening detecting module according to the present invention will be described in more detail below with reference to FIG. 6 below.

Figure 6:
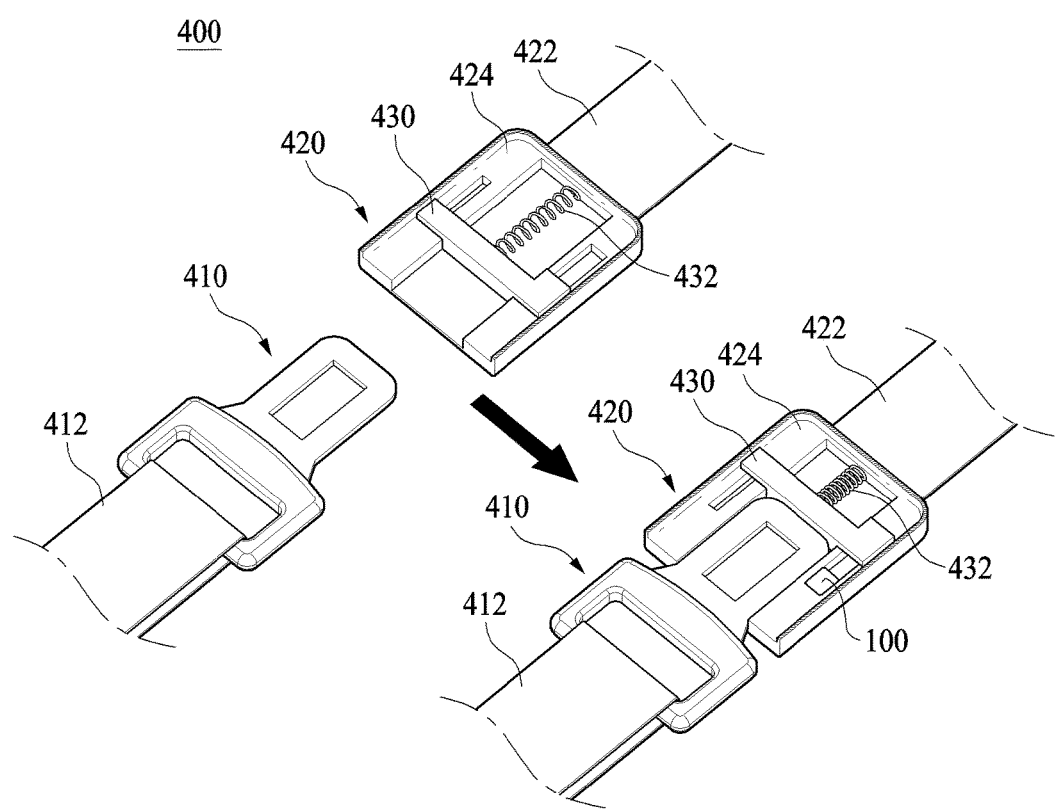
FIG. 6 is a diagram illustrating a configuration and an operation state of the seat belt provided with a transmitting unit in the seat belt fastening detecting module of FIG. 1.

FIG. 6 is a diagram illustrating a configuration and an operation state of the seat belt 400 provided with the transmitting unit 100 in the seat belt 400 fastening detecting module of FIG. 1.

As described above, the seat belt 400 according to the present invention has a scheme, in which the first line 412 and the second line 422 are connected by using the general tongue 410 and buckle 420, and the transmitting unit 100 is embedded in the buckle 420.

In this case, the transmitting unit 100 embedded in the buckle 420 transmits the signal generated by the transmitting unit 100 to the outside according to the insertion of the tongue 410 into the buckle 420.

Accordingly, the buckle 420 according to the present invention includes a cover 424 coupled with the tongue 410, and a shielding member 430, of which a position is adjusted according to a coupling state of the tongue 410 inside the cover 424, and which selectively blocks the signal from being transmitted to the outside.

Particularly, the cover 424 includes a separate sliding member therein, and the sliding member is pushed by the tongue 410 when the tongue 410 is inserted and slides. In this case, the cover 424 is provided with a separate elastic body 432 at the other side, into which the tongue 410 is inserted, so that when the tongue 410 is separated from the buckle 420, the sliding member returns to an original position.

In the meantime, the shielding member 430 is configured to surround the transmitting unit 100 provided inside the cover 424 and shields the signal generated by the transmitting unit 100 from being transmitted to the outside. Further, the shielding member 430 is configured so that a position thereof is selectively adjusted inside the cover 424, so that when the sliding member slides by the tongue 410, the position of the shielding member 430 is adjusted together with the sliding member.

That is, the position of the shielding member 430 is adjusted when the sliding member slides to allow the signal generated by the transmitting unit 100 to be transmitted to the outside, and when the sliding member returns to the initial position by the elastic body 432, the shielding member 430 also returns to an initial position and surrounds the transmitting unit 100.

Accordingly, when the tongue 410 is coupled with the buckle 420 as illustrated in FIG. 6, the shielding member 430 slides together with the sliding member, so that the shielding of the transmitting unit 100 may be stopped and the receiving unit 200 may receive the signal.

In this case, in the present exemplary embodiment, the sliding member and the shielding member 430 are integrally formed, but unlike this, the sliding member and the shielding member 430 may be separately formed.

By the buckle 420 formed as described above, when the passenger fastens the seat belt 400, the shielding of the signal generated by the transmitting unit 100 is blocked, and thus, the receiving unit 200 receives the signals transmitted from the positions of the seats, of which the seat belts 400 are fastened, among the plurality of seats.

Further, the display unit 300 displays the position of the first seat, on which the passenger is seated, and whether the passenger fastens the seat belt 400 in the first seat to the driver by using the signal information received from the receiving unit 200.

In addition, when the passenger unfastens the seat belt 400, the operation of the transportation means is set to be disabled, so that it is possible to fundamentally prevent the unfastening of the seat belt 400 by providing the seat belt 400 fastening detecting module to the transportation means.

As described above, when the passenger releases the seat belt 400 on the first seat, on which the passenger is seated, during the operation of the transportation means, the release of the fastening belt 400 may be displayed to the driver through the display unit, or a separate alarm.

In the meantime, the specific exemplary embodiment of the present invention is described and illustrated as described above, but those skilled in the art will be appreciated that the present invention is not limited to the described exemplary embodiment, and may be variously corrected and modified without departing from the spirit and the scope of the present invention. Accordingly, corrected examples or modified examples should not be individually understood from the technical spirit or the aspect of the present invention, and the modified exemplary embodiments belong to the claims of the present invention.

[Descriptions of main reference numerals]

| | |
|---|---|
| 100: Transmitting unit | 200: Receiving unit |
| 300: Display unit | 310: First color |
| 320: Second color | 330: Third color |
| 400: Seat belt | 410: Tongue |
| 420: Buckle | 430: Shielding member |

The invention claimed is:

1. A module for detecting fastening of a seat belt in a transportation means including a plurality of seats, the module comprising:
   a plurality of transmitting units each provided in each of a plurality of seats of a transportation means, the transmitting units being configured to detect whether a seat belt provided in each of the plurality of seats is fastened and generate a first signal;
   a receiving unit configured to receive the first signals transmitted from the transmitting units; and
   a display unit configured to display information about each of the plurality of seats based on the first signals received in the receiving unit,
   wherein the module is configured such that the display unit displays a first color to define a first colored fastened seat when the seat belt is detected as being fastened, and to display a second color to define a second colored empty seat when the seat belt is detected as not being fastened,
   wherein the module is further configured such that, after the transportation means is operated at a predetermined speed or more for a predetermined time, the transmitting units detects again whether the seat belt provided in each of the plurality of seats is fastened, and generates and sends a second signal to the receiving unit,
   wherein the module is further configured such that the first colored fastened seat displays a third color when the first colored fastened seat is detected as not being fastened, based on the second signals, and
   wherein the module is further configured such that the second colored empty seat displays a fourth color when the second colored empty seat is detected as being fastened based on the second signals.

* * * * *